United States Patent
Zahir et al.

(10) Patent No.: US 11,555,137 B1
(45) Date of Patent: Jan. 17, 2023

(54) METHOD OF FORMING PHASE CHANGE MATERIAL

(71) Applicant: KING FAHD UNIVERSITY OF PETROLEUM AND MINERALS, Dhahran (SA)

(72) Inventors: Md. Hasan Zahir, Dhahran (SA); Aasif Helal, Dhahran (SA); Abbas S. Hakeem, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 17/751,125

(22) Filed: May 23, 2022

(51) Int. Cl.
| | |
|---|---|
| *C09K 5/06* | (2006.01) |
| *C09K 5/14* | (2006.01) |
| *B01J 20/22* | (2006.01) |
| *C09K 5/08* | (2006.01) |
| *C08G 83/00* | (2006.01) |
| *C07F 7/00* | (2006.01) |
| *C01B 37/00* | (2006.01) |
| *B29C 33/38* | (2006.01) |

(52) U.S. Cl.
CPC .............. *C09K 5/063* (2013.01); *B01J 20/226* (2013.01); *C09K 5/08* (2013.01); *C09K 5/14* (2013.01); *B29C 33/3807* (2013.01); *C01B 37/00* (2013.01); *C07F 7/00* (2013.01); *C08G 83/008* (2013.01)

(58) Field of Classification Search
CPC .. C09K 5/063; C09K 5/08; C09K 5/14; B29C 33/3807; C08G 83/008; B01J 20/226; C07F 7/00; C01B 37/00
See application file for complete search history.

(56) References Cited

U.S. PATENT DOCUMENTS

| | | | |
|---|---|---|---|
| 6,893,564 B2 * | 5/2005 | Mueller | B01J 20/28014 502/154 |
| 7,524,444 B2 * | 4/2009 | Hesse | B01J 20/226 264/109 |
| 10,106,717 B2 | 10/2018 | Han et al. | |

FOREIGN PATENT DOCUMENTS

| | | |
|---|---|---|
| CN | 108624295 B | 9/2020 |
| CN | 112827495 A | 5/2021 |

(Continued)

OTHER PUBLICATIONS

Mallick et al. "Advances in shaping of metal-organic frameworks for CO2 capture: understanding the effect of rubbery and glassy polymer binders", Ind. & Eng. Chem. Res., 2018, 57, 16897-16902. w/supplemental information. published online Sep. 7, 2018. (Year: 2018).*

(Continued)

*Primary Examiner* — Jane L Stanley
(74) *Attorney, Agent, or Firm* — Oblon, McClelland, Maier & Neustadt, L.L.P.

(57) ABSTRACT

A method to form a phase change material (PCM). The method includes preparing a polymer solution by mixing an amount of a polymer in a solvent and mixing the polymer solution with an UiO-66 metal-organic framework (MOF) to form a composite. The polymer is a polyethylene glycol (PEG). The method further includes subjecting the composite to ultrasonic agitation and evaporating the solvent from the composite to form the PCM. After the evaporation of the solvent, particles of the PCM exhibit rounded octahedral structures.

16 Claims, 14 Drawing Sheets

(56) References Cited

FOREIGN PATENT DOCUMENTS

| CN | 112920778 A | 6/2021 |
|---|---|---|
| WO | 2021/031976 A1 | 2/2021 |

OTHER PUBLICATIONS

Wang et al. "Construction of CNT@Cr-MIL-101-NH2 hybrid composite for shape-stabilized phase change materials with enhanced thermal conductivit", Chem. Eng. J., 350, 2018, 164-172. w/supplemental information. published online May 31, 2018 (Year: 2018).*

Butova et al. "Synthesis of the metal-organic framework UiO-66 in the form of nanoparticles with a modified surface", J. Surface Investigation: X-ray, Synchrotron and Neutron Techniques, 2021, vol. 15, No. 5, 920-926. Published Oct. 19, 2021 (Year: 2021).*

Semino et al. "Understanding the origins of metal-organic framework/polymer compatibility", Chem. Sci., Sep. 2018, 315-324. Published online Oct. 27, 2017 (Year: 2017).*

Khan et al. "Mixed dimensional nanostructure (UiO-66-decorated MWCNT) as a nanofiller in mixed-matrix membranes for enhanced CO2/CH4 separation", Chem. Eur. J, 2021, 27, 11132-11140. published online May 25, 2021 (Year: 2021).*

Ayala et al. "Blockco-polyMOFs: morpholigy control of polymer-MOF hybrid materials", Chem. Sci, Oct. 2019, 1746-1753. published online Nov. 30, 2018. (Year: 2018).*

Zahir et al. "Hybrid polyMOF materials prepared by combining an organic polymer with a MOF and their application for solar thermal energy storage", Energy Fuels, 2021, 35, 10199-10209. published online May 25, 2021 (Year: 2021).*

Ayala et al. "Heirarchical structure and porosity in UiO-66 polyMOFs", Chem. Commun, 2017, 53, 3058-3061. published online Feb. 21, 2017. (Year: 2017).*

Li, et al.; Thermal properties of PEG/MOF-5 regularized nanoporous composite phase change materials: A molecular dynamics simulation; Case Studies in Thermal Engineering 26; May 1, 2021; 14 Pages.

Atinafu, et al.; A novel enhancement of shape/thermal stability and energy-storage capacity of phase change materials through the formation of composites with 3D porous (3,6)-connected metal-organic framework; Chemical Engineering Journal vol. 389; Jun. 1, 2020; Abstract Only; 2 Pages.

* cited by examiner

METHOD OF FORMING PHASE CHANGE MATERIAL

STATEMENT OF PRIOR DISCLOSURE BY THE INVENTOR

Aspects of the present disclosure are described in H. Zahir; "Hybrid polyMOF materials prepared by combining an organic polymer with a MOF and their application for solar thermal energy storage"; May 25, 2021; American Chemical Society Energy and Fuels, incorporated herein by reference in its entirety.

BACKGROUND

Technical Field

The present disclosure generally relates to a method of forming a phase change material (PCM) for energy storage, and particularly to a method to form a PCM based on metal-organic frameworks (MOFs).

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Metal-organic frameworks (MOFs), also known as porous coordination polymers (PCPs), are generaly classified as microporous materials, though mesopores with different sizes may be observed. MOFs include cationic metal ion clusters, known as Secondary Building Units (SBUs), which are bridged by organic anionic linkers forming polyvalent coordinative bonds. MOFs exhibit a highly symmetrical, crystalline construction of the lattice structures, and very large specific surface area. High porosity at molecular level makes them useful for applications such as gas storage, catalysis, absorption heat transformation, etc. For energy storing applications, there are some inherent advantages offered by MOFs such as structural diversity, functionality, tailorability, and versatility. The structures and properties of MOFs can be easily tailored by changing the species, geometry, size, and functionality of the modules via pre-design or post-synthetic modifications. Immobilization of active functional materials on MOFs and creation of highly controllable nanostructures has gained momentum for energy applications. Despite this, pure MOFs generally have a low thermal conductivity, and low latent heat, thus making them less effective for use in energy storage applications.

Phase Change Materials (PCMs), also known as latent heat storage materials, have gained popularity in thermal energy storage field. Phase change materials (PCMs) are substances which release or absorb a large amount of energy during a phase transition, usually from solid to liquid and vice-versa, although it is also possible in principle to use solid-solid phase changes, for example, where the substance goes from conforming to one crystalline structure to conforming to another. PCMs store latent heat and utilize the heat of fusion during the phase transition. During phase changes, the temperature of the PCM remains nearly constant, despite addition of more heat. Thus, the heat flowing through the PCM gets "stored" within the PCM itself and is referred to as latent heat. Any appreciable temperature increase is only observed after the phase change is complete. Water, paraffin waxes, bee wax, glycerin, fatty acids, etc., are commonly known PCMs.

Though PCMs are useful energy storage materials, they suffer from a number of drawbacks, for example, the loss of PCM by leakage, low thermal conductivity, etc. Leakage poses a serious issue of environment contamination and low thermal conductivity limits their effectiveness for solar energy storage.

Leakage issues can be overcome by employing shape-stabilization of PCMs. Recently, many research groups have reported that shape-stabilized PCMs (ss-PCMs), typically fabricated using a polymer as the functional phase encapsulated in an inorganic support. Support materials usable to prevent the flow of liquid PCMs are expanded graphite (EG), expanded perlite (EP), vermiculite, high density polyethylene, styrene, butadiene and so on. To enhance the thermal conductivity of PCM, additive materials such as EG, montmorillonite, pentaerythritol, melamine polyphosphate are used. Normally, the PCMs, supporting materials, and additive materials are melted and mixed fully together at high temperature, and the formed compound, ss-PCM, is then cooled down and shaped in mold until it becomes solid.

However, presently available ss-PCMs still suffer from problems like low surface area, low pore volume, and complex preparation methods. The thermal, physical, chemical, and mechanical properties of ss-PCMs are heavily dependent on the raw materials and synthesis processes. Moreover, the encapsulation efficiency is unsatisfactory and the particle sizes need to be reduced.

PolyMOFs, formed using organic polymers as the organic component of the MOF lattice, retain the beneficial characteristics MOFs, such as enhanced porosity and crystallinity It has been reported that polyMOFs can be developed by mixing PBDC-8A (PBDC—AB2 triblock copolymer) and PEG-2000-2% or PEG-4000-1%. The synthesized polyMOFs exhibit better viscoelasticity, enhanced conductivity, improved coordinative ability, etc. However, this combination produces an aggregated octahedral morphology. Block copolymers with a large PEG quantity hamper octahedra formation. Further, an interlaced morphology is observed for polyUiO-66 prepared from PBDC-8A-PEGMnOMe.

The use of a PEG-MOF based ss-PCM for thermal energy storage has been reported. A latent heat value of 120.53 J/g was achieved using the SA@Cr-MIL-101-$NH_2$ stabilized PCM composites. But the performance parameters, charging and discharging values, thermal conductivity, seepage test results, and compatibility of the fabricated ss-PCM was not reported.

Feng et al. in their publication titled "*Phase change in modified metal organic frameworks MIL-101(Cr): Mechanism on highly improved energy storage performance*" reported the composite MOF material MIL-101(Cr)—$NH_2$ loaded with stearic acid and the thermal properties associated with its phase transition. However, both Feng et al. and Luan et al. reported a very low latent heat value and did not mention any other important storage parameters.

In light of aforementioned shortcomings and gaps in the research area, there exists a need to provide a superior PCM with high storage capacity, high latent heat, higher thermal conductivity, and improved leakage characteristics. In addition, there exists a need to provide a method of preparing such PCM. There also exists a need to provide a method of preparing a polyMOF based PCM composite formed by a combination of at least one polymer and at least one MOF.

SUMMARY

In an exemplary embodiment, a method to form a phase change material (PCM) is disclosed. The method comprises preparing a polymer solution by mixing an amount of a polymer in a solvent and mixing the polymer solution with an UiO-66 metal-organic framework (MOF) to form a composite. The polymer is a polyethylene glycol (PEG). The method further comprises subjecting the composite to ultrasonic agitation and evaporating the solvent from the composite to form the PCM. After the evaporation of the solvent, particles of the PCM exhibit rounded octahedral structures.

In some embodiments, the solvent is ethanol and the PEG has an average molecular weight from 4000 to 10000.

In some embodiments, the PEG for preparing the polymer solution has an average molecular weight of 6000.

In some embodiments, the PCM has a thermal conductivity of from 0.8 to 0.9 W/mK and the PCM has an energy storage efficiency from 92% to 97%.

In some embodiments, the particles of the rounded octahedral structure have a size in a longest dimension that ranges from 200 nm to 500 nm.

In some embodiments, the PCM is a shape stabilized phase change material (ss-PCM) having a PEG:UiO-66 weight ratio of from 0.5:0.2 to 1.0:0.2. The ss-PCM has a latent heat value of from 125 J/g to 175 J/g at a PEG:UiO-66 weight ratio of 0.5. Further, the ss-PCM has a thermal conductivity from 0.4 W/mK to 0.6 W/mK at a PEG:UiO-66 weight ratio of 0.5.

In some embodiments, the particles of the rounded octahedral structure have a BET surface area of from 750 $m^2$/g to 1250 $m^2$/g.

In some embodiments, the mixing of the polymer solution further comprises mixing carbon nanotubes (CNTs) with at least one of the polymer solution, the MOF, or a combination of both the polymer solution and the MOF to form a PCM containing carbon nanotubes.

In some embodiments, the method forms a PCM comprising the CNTs in an amount from 1 wt. % to 4 wt. % of the PCM.

In some embodiments, the PCM has an impregnation ratio of at least 60%.

In some embodiments, the PCM has a freezing temperature of at least 35° C. and a melting temperature of at least 55° C.

In some embodiments, the PCM has an impregnation efficiency of at least 55%.

In some embodiments, the PCM has a heat storage efficiency of at least 99%.

In some embodiments, the PCM has an energy storage ability of at least 70%.

In some embodiments, the particles of the rounded octahedral structure have a micropore volume from 0.25 $cm^3$/g to 2.5 $cm^3$/g.

In some embodiments, the particles of the rounded octahedral structure have a pore diameter from 5 Å to 50 Å.

In some embodiments, the PCM has a latent heat in a freezing process of at least 100 J/g.

In some embodiments, the PCM has a latent heat in a melting process of at least 110 J/g.

In some embodiments, the mixing of the polymer solution further comprises using an amine group-containing compound with at least one of the polymer solution, the MOF, or a combination of both the polymer solution and the MOF.

In some embodiments, a PEG-UiO-66 PCM prepared by the method in which the particles of the PCM exhibit rounded octahedral structures.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
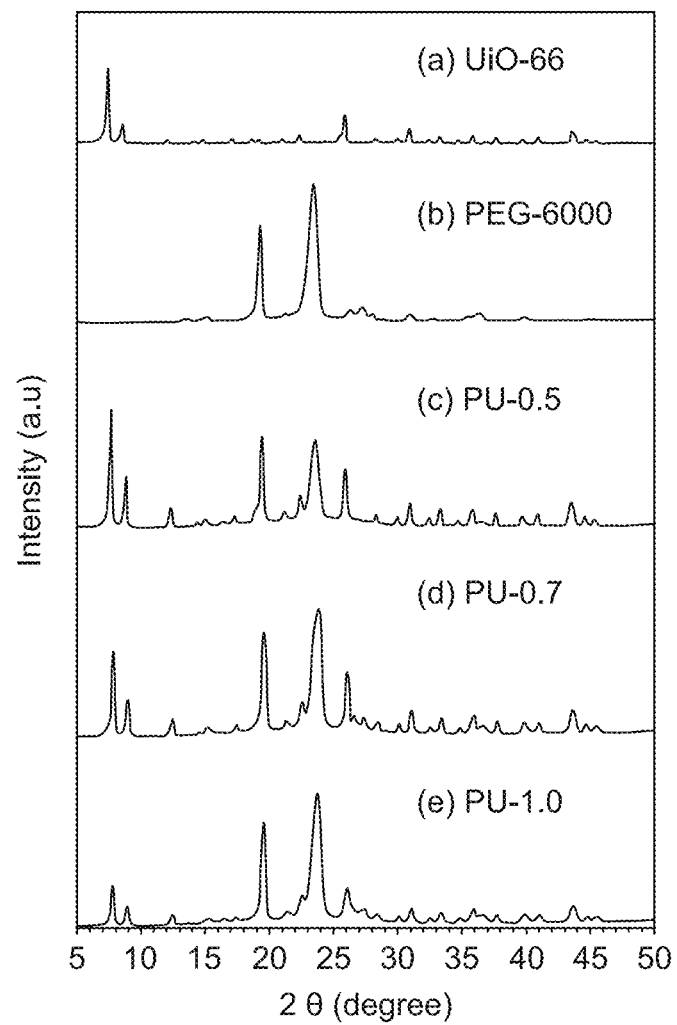
FIG. 1 shows PXRD plot depicting the spectra of (a) UiO-66, (b) PEG-6000, (c) PU-0.5 PCM samples, (d) PU-0.7 PCM samples, and (e) PU-1.0 PCM samples, according to certain embodiments of the present disclosure.

The definitions of the terms as used herein are as follows. Unless specified otherwise, these terms are used alone or in combination with another term in the meaning as defined.

Throughout the specification and the appended claims, a given chemical formula or name shall encompass all isomers (stereo and optical isomers and racemates) thereof where such isomers exist. Unless otherwise indicated, all chiral (enantiomeric and diastereomeric) and racemic forms are within the scope of the disclosure. Many geometric isomers of C=C double bonds, C=N double bonds, ring systems, and the like can also be present in the compounds, and all such stable isomers are contemplated in the present disclosure. Cis- and trans- (or E- and Z-) geometric isomers of the compounds of the present disclosure are described and may be isolated as a mixture of isomers or as separated isomeric forms.

All processes used to prepare compounds of the present disclosure and intermediates made therein are considered to be part of the present disclosure. Both the free form and salts of products are within the scope of the disclosure. If so desired, one form of a compound may be converted into another form. Further, a given chemical formula or name shall encompass all conformers, rotamers, or conformational isomers thereof where such isomers exist. Different conformations can have different energies, can usually interconvert, and are very rarely isolatable.

The term "latent heat" as used herein, refers to the energy absorbed or released by a substance during a change in its physical state, wherein said change occurs without a corresponding change in its temperature. One or more substances having high latent heat may be used for energy storage which include acetic acid, acetone, alcohol (ethyl or methyl), aluminum, ammonia, aniline, benzene, bismuth, brass, carbon dioxide, carbon tetrachloride, cast iron, chromium, cobalt, copper, decane, dodecane, ethyl ether, ethylene glycol, glycerin, heptane, hexane, iron, manganese, naphthalene, nickel, octane, paraffin, phenol, platinum, silver, water, and zinc.

The term "PCM" or "Phase Change Material" as used herein, refers to those substances which can absorb or release a large amount of latent heat, as defined herein, when they go through a change in their physical state, i.e., from one physical state to other physical state and vice-versa. Non-limiting examples of PCMs include paraffin-based materials, acids, sugars, sulfates, chlorides, aluminum, copper, gold, iron, lead, lithium, silver, titanium, zinc, nitrates, hydroxides, fatty acids, alcohols, and glycols.

The term "ss-PCM" or "Shape Stabilized PCM" as used herein, refers to PCMs, as defined herein, which use porous matrices as support. Non-limiting examples of porous support matrices include mesoporous carbon, mesoporous silica, graphene, carbon nanotubes, metal foams, and metal-organic frameworks.

As used herein "metal-organic frameworks" or MOFs are compounds having a lattice structure made from (i) a cluster of metal ions as vertices ("cornerstones")("secondary building units" or SBUs) which are metal-based inorganic groups, for example metal oxides and/or hydroxides, linked together by (ii) organic linkers. The linkers are usually at least bidentate ligands which coordinate to the metal-based inorganic groups via functional groups such as carboxylates and/or amines. MOFs are considered coordination polymers made up of (i) the metal ion clusters and (ii) linker building blocks. Preferably a UiO-66 MOF is deployed according to certain embodiments of the present disclosure. The UiO-66 MOF is made up of $[Zr_6O_4(OH)_4]$ clusters with 1,4-benzodicarboxylic acid struts. The terephthalic acid can be substituted with one or more alkyl groups, one or more carboxylic acids, or one or more phosphate groups. Non-limiting examples of suitable MOFs include UiO66-NH2, UiO-67, UiO-68, HKUST-1, LIC-1, CPL-2, Cu-MOF, Cu-TDPAT, Ni-MOF, Zr-MOF, Zn-TSA Fe—P-MOF, TMU-16-NH2 F-MOF-1, MOP-1, MOF-74, MOF-101, MOF-177, MOF-235, MOF-253, MOF-5, IRMOF-16, MIL-53, MIL-53 (Al)—$NH_2$, MIL-88A, MIL-88-Fe, MIL-88B-4CH3, MIL-100-Fe, MIL-101, PCN-333-Al, ZIF-8, ZIF-67, and ZIF-90.

The term "PEG" or "Polyethylene glycol" as used herein, refers to a condensation polymer of ethylene oxide and water, preferably synthesized using a ring-opening polymerization of ethylene oxide to produce a range of molecular weights and molecular weight distributions. PEGs can be synthesized in linear, branched, Y-shaped, star, comb, or multi-arm geometries. Non-limiting examples of PEG include PEG-100, PEG-200, PEG-400, PEG-600, PEG-800, PEG-1000, PEG-2000, PEG-4000, PEG-6000, PEG-8000, PEG-10000.

The term "PolyMOF" or "Polymer-MOF" as used herein, refers to MOFs synthesized using organic polymers as the organic component of the MOF lattice. One or more polymers may be used in the polymer solution such as alkylene glycol, e.g., ethylene glycol and/or propylene glycol, polyvinylpyrrolidone, or poly (N-(2-hydroxypropyl) methacrylamide) (PHPMA). Non-limiting examples of organic polymers include epoxies, phenolics, polyurethanes, polyimides, amino resins, bismaleimides, glycidyls, aliphatic amines, cycloaliphatic amines, polyaminoamides, anhydrides, isocyanates, and polylactides.

The term "PEG-MOF" as used herein, refers to polyMOFs, as defined herein, in which the polymer used as the organic component of the MOF lattice is a PEG organic polymer.

In the drawings, like reference numerals designate identical or corresponding parts throughout the several views. As used herein, the words "a," "an" and the like generally carry a meaning of "one or more," unless stated otherwise. Further, the terms "approximately," "approximate," "about," and similar terms generally refer to ranges that include the identified value within a margin of 25%, 20%, 10%, or 5%, and any values therebetween. Furthermore, the terms "equal to," "substantially equal to," and similar terms generally refer to ranges that include the identified value within a margin of 75%, 80%, 85%, 90%, 95%, or 100%, and any values therebetween.

As used herein, the terms "optional" or "optionally" means that the subsequently described event(s) can or cannot occur or the subsequently described component(s) may or may not be present (e.g., 0 wt. %).

Aspects of the present disclosure are directed to a method to form a phase change material (PCM) comprising a combination of at least one polymer and at least one MOF. Aspects of the present disclosure are also directed to a method to form a phase change material (PCM) comprising a combination of at least one polymer, at least one MOF, and carbon nanotubes (CNTs). In some examples, the aspects of present disclosure are directed to preparation of composite PCMs comprising at least one organic or inorganic phase change material, at least one MOF, and optionally CNTs. The organic phase change material that may be utilized in various aspects is preferably an organic polymeric material. The inorganic phase change material that may be utilized in various aspects is preferably a hydrated salt or a metallic material. Further aspects of the present disclosure are related to a polymer-MOF based PCM prepared by the methods disclosed herein.

In an aspect of the present disclosure, the method of preparation of a phase change material (PCM) includes preparation of a polymer solution by mixing an amount of a polymer in a solvent; mixing the polymer solution with a metal-organic framework (MOF) to form a composite; subjecting the composite to agitation; and removing the solvent from the composite to form the phase change material (PCM).

The polymer solution may be prepared by mixing a suitable polymer with any compatible solvent. The polymer may be a paraffin- or a non-paraffin-based material. In a non-limiting example, the paraffin-based material may be a paraffin n-carbons material, wherein n represents number of carbon atoms present in the paraffin material and may be greater than or equal to 14 and less than or equal to 34, preferably greater than or equal to 19 and less than or equal to 29, or preferably 24. In another non-limiting example, the non-paraffin-based material may be selected from a group consisting of fatty acids, alcohols, and glycols. In a non-limiting example, the non-paraffin-based material is a fatty acid. In some examples, the fatty acid is caprylic acid, capric acid, lauric acid, myristic acid, palmitic acid, stearic acid, or the like. In another non-limiting example, the non-paraffin-based material is an alcohol. In some examples, the alcohol is capric alcohol, lauryl alcohol, myristyl alcohol, cetyl alcohol, stearyl alcohol, or the like. In another preferred embodiment the non-paraffin-based material is a glycol and/or a polyglycol. In some examples, the glycol is a polyethylene glycol (PEG). PEG may be selected from a group of PEG homopolymers within a defined weight average molecular weight range such as for example PEG-200, PEG-400, PEG-600, PEG-800, PEG-1000, PEG-2000, PEG-4000, PEG-6000, PEG-8000, PEG-10000, and the like. In certain embodiments, the PEG may be combined with another polymer such as polyvinyl alcohol, poly (lactic-co-glycolic acid), poly(lactic-co-glycol), polylactic acid, polycaprolactone, polyglycolic acid, polybutylene terephthalate, or polyethylene terephthalate.

The solvent utilized for preparing the polymer solution may be selected based on the choice of the polymer. In a non-limiting example, the solvent may be a polar protic, a polar aprotic, or a non-polar solvent. Exemplary polar protic solvents that may be used include water, methanol, ethanol, isopropyl alcohol, acetic acid, etc. Exemplary polar aprotic solvents that may be used include dichloromethane, tetrahydrofuran, ethyl acetate, acetonitrile, dimethyl formamide, dimethyl sulfoxide, acetone, hexamethylphosphoric triamide, etc. Exemplary non-polar solvents that may be used include pentane, hexane, benzene, carbon tetrachloride, diethyl ether, xylene, toluene, acetic acid, chloroform, and ethyl acetate.

The MOF used in the method of the present disclosure is desired to exhibit at least one of the following characteristics: (a) large surface area, (b) high pore volume, (c) high storage capacity, (d) minimum mass transfer limitation, and (e) high stability especially hydrothermal stability. In an aspect of the present disclosure, the MOF is desired to exhibit characteristic (e) and at least one characteristic selected from (a) to (d). In another aspect of the present disclosure, the MOF exhibits all the aforementioned characteristics. In a preferred embodiment, the particles of the rounded octahedral structure may have a BET surface area from 750 $m^2/g$ to 1250 $m^2/g$, a micropore volume from 0.25 $cm^3/g$ to 2.5 $cm^3/g$, and an energy storage efficiency of at least 99%.

Exemplary MOFs suitable for use with the methods of the present disclosure include Zr-based MOFs like UiO-66, UiO-67, MOF-808, NU-1000, Al-based MOFs like MIL-96, MIL-100, MIL-110, Cu-based MOFs like HKUST-1, Cr-based MOFs, Cd-based MOFs, etc. Further, the MOF employed may carry post-synthetic modifications (PSMs), enhancing its desired properties or functionalities. In a non-limiting example, the MOF may have been modified by (a) metal or organic ligand substitution strategy to obtain an MOF with mixed metal/ligands; or (b) chemical function decoration to obtain an MOF decorated and/or substituted with a functional group, for example, but not limited to, an alkyl substituted-, aryl substituted-, an amine decorated-, a carboxylate decorated-, a nitro decorated, or a bifunctional modified-MOF.

In an aspect of the present disclosure, the mixing further comprises mixing carbon nanotubes (CNTs) with at least one of the polymer solution, the MOF, or a combination of both the polymer solution and the MOF. In another aspect of the present disclosure, the mixing further comprises using an amine group-containing compound with at least one of the polymer solution, the MOF, or a combination of both the polymer solution and the MOF. In another aspect of the present disclosure, the mixing further comprises using CNTs and an amine group-containing compound with at least one of the polymer solution, the MOF, or a combination of both the polymer solution and the MOF.

The composite obtained from mixing an MOF and a polymer, according to various aspects of the present disclosure, is further subjected to agitation. The agitation may be performed by any suitable methods known for example, but not limited to, mechanical, magnetic, or ultrasonic. Ultrasonication may be of any suitable power ranging from 20 W to 100 W, preferably 30 W to 90 W, preferably 40 W to 80 W, preferably 50 W to 70 W, or 60 W. Ultrasonication may also be of any suitable time ranging from 10 minutes to 1 hour, preferably 20 minutes to 40 minutes, or 30 minutes.

Further, the composite obtained after the mixing or agitation, is processed to remove or separate the solvent to isolate the phase change material (PCM). In a non-limiting example, the solvent may be removed or separated using decanting, filtration, evaporation, vacuum drying, vacuum evaporation, vacuum concentration, heating, or a combination thereof.

Now turning to a particular aspect of the present disclosure, a method to form a PEG-UiO-66 based PCM is disclosed. The method includes preparation of a PEG polymer solution by mixing an amount of PEG polymer in a solvent; mixing the polymer solution with UiO-66 MOF to form a composite; subjecting the composite to ultrasonic agitation; and evaporating the solvent from the composite to form the PCM.

In another aspect of the present disclosure, a method to form a PEG-UiO-66-CNT based PCM is disclosed. The method includes preparation of a PEG polymer solution by mixing an amount of PEG polymer in a solvent; mixing the polymer solution with an UiO-66 metal-organic framework (MOF) to form a composite; subjecting the composite to ultrasonic agitation; and evaporating the solvent from the composite to form the PCM. Carbon nanotubes (CNTs) are mixed with the solvent and polymer when forming the PEG polymer solution. In other embodiments the carbon nanotubes are mixed with at least one of the polymer solution, the MOF, or a combination of both the polymer solution and the MOF. The formed PCM may comprise CNTs in an amount from 1 wt. % to 4 wt. % of the PCM, preferably at 1.5 wt. % to 3.5 wt. % of the PCM. Preferably 2 wt. % to 3 wt. % of the PCM, or 2.5 wt. % of the PCM.

The solvent employed for preparing the PEG polymer solution in any of the aforementioned aspects may be chosen from any of the above-mentioned exemplary solvent types. In some examples, the solvent is a polar protic solvent. In some examples, the solvent used is ethanol.

Further, the PEG polymer used for preparing the polymer solution, as described in earlier aspects of the present disclosure, may be of any suitable average molecular weight ranging from as low as 200 to as high as 20,000. In some examples, the PEG has an average molecular weight ranging from 2,000 to 10,000. In some examples, the PEG has an average molecular weight ranging from 4,000 to 8,000. In some examples, the PEG has an average molecular weight of about 6,000.

Figure 6A:
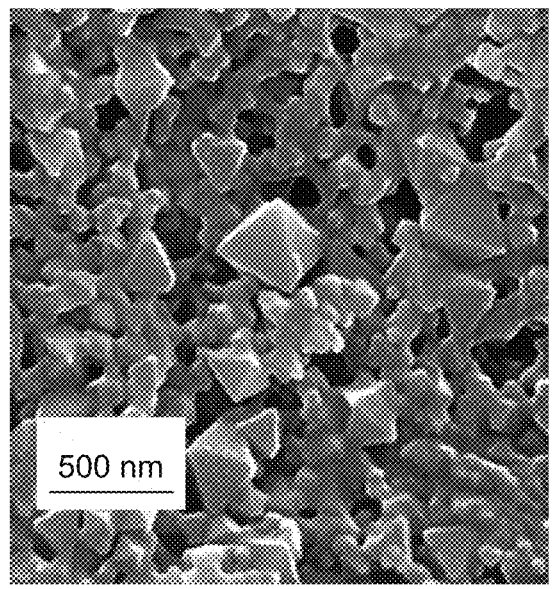
FIG. 6A shows FESEM image of as-synthesized PU-1000-0.5 PCM samples at a higher magnification, according to certain embodiments of the present disclosure.
Figure 6B:
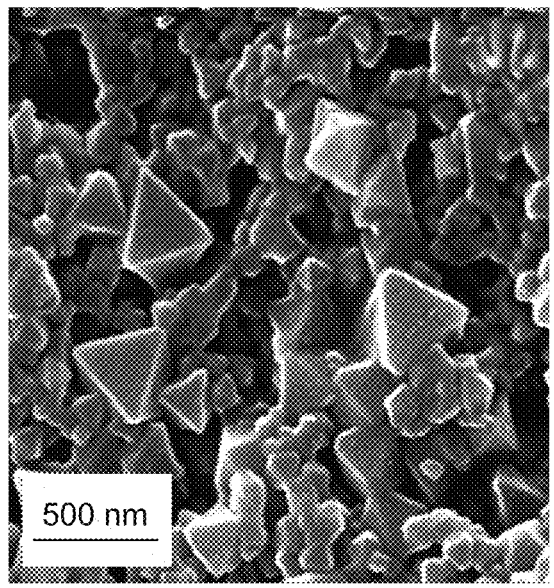
FIG. 6B shows FESEM image of as-synthesized PU-4000-0.5 PCM samples at a higher magnification, according to certain embodiments of the present disclosure.
Figure 6C:
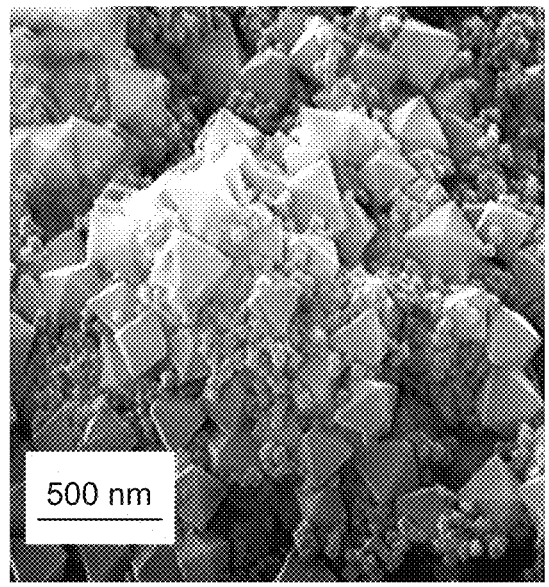
FIG. 6C shows FESEM image of as-synthesized PU-6000-0.5 PCM sample at a higher magnification, according to certain embodiments of the present disclosure.
Figure 6D:
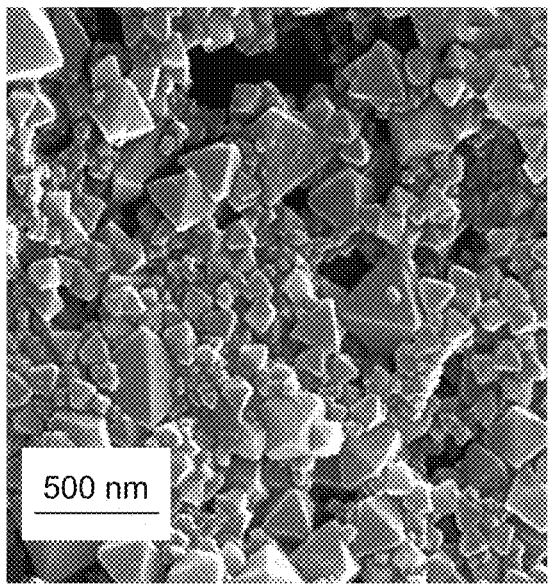
FIG. 6D shows FESEM image of as-synthesized PU-10000-0.5 PCM samples at a higher magnification, according to certain embodiments of the present disclosure.
Figure 7A:
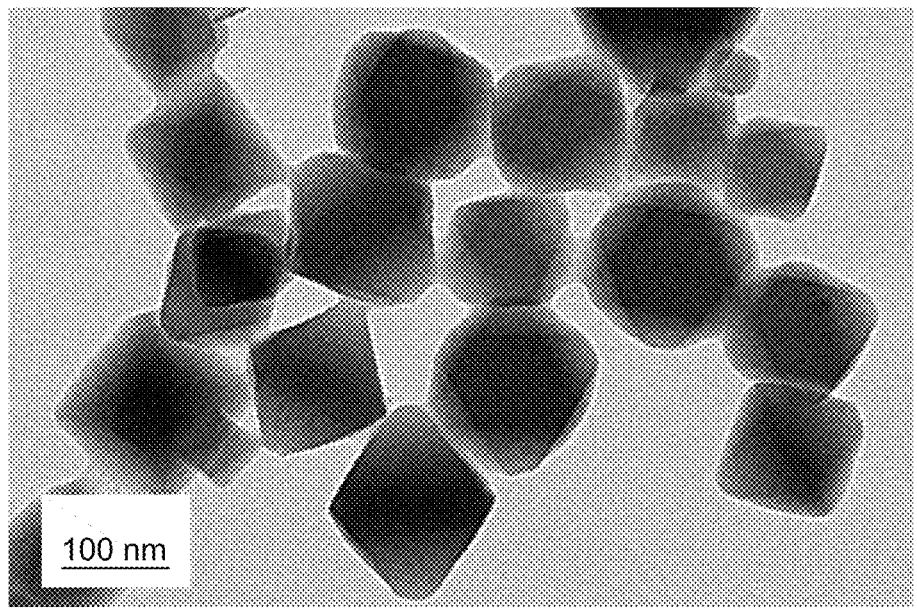
FIG. 7A shows TEM image of as-synthesized UiO-66, according to certain embodiments of the present disclosure.

The particles of the PCM obtained by the methods of the present disclosure exhibit rounded octahedral structures. As depicted in FIG. 6C, the PCM may contain a first particle size distribution of octahedral PCM particles and a second particle size distribution of unreacted PEG such that an aggregated octahedral morphology is formed. The aggregated octahedral morphology is an intermediate structure of the unsynthesized PCM. As depicted in FIG. 7A, the PCM is now fully synthesized and the PCM particles have an octahedral shape, displaying eight triangular faces on the outside surface. The octahedral PCM particles are also rounded, as depicted in FIG. 7A, where the top and bottom tips of the particles are worn down to the point where the tips display a rounded curvature at the tip instead of a sharp triangular pattern. The roundedness can be attributed to having a circular or cylindrical cross-section at each tip of the particle, without the entire particle taking on a spherical shape due to its octahedral nature. The roundedness can be further described by having a perfect octahedron where a face dimension is 1 cm, but an octahedron with a rounded edge has a longest dimension that is 0.9 cm preferably 0.95 cm due to removal of the apex of the octahedron thereby shortening the face dimension and leaving a hemispherical shape at the location of the apex. The size of the octahedral structures increases with an addition of the PEG at higher molecular weights. In a non-limiting example, the particles of the rounded octahedral structure may have a size in a longest dimension that ranges from 200 nm to 500 nm, preferably 225 nm to 475 nm, preferably 250 nm to 450 nm, preferably 275 nm to 425 nm, preferably 300 nm to 400 nm, preferably 325 nm to 375 nm, or 350 nm. In another non-limiting example, the particles of the rounded octahedral structure may have a BET surface area from 750 $m^2/g$ to 1250 $m^2/g$, preferably 800 $m^2/g$ to 1200 $m^2/g$, preferably 950 $m^2/g$ to 1150 $m^2/g$, preferably 1000 $m^2/g$ to 1100 $m^2/g$, or 1050 $m^2/g$. In another non-limiting example, the particles of the rounded octahedral structure may have a micropore volume ranging from 0.25$cm^3/g$ to 2.5 $cm^3/g$, preferably 0.5 $cm^3/g$ to 2 $cm^3/g$, preferably 0.5 $cm^3/g$ to 1.5 $cm^3/g$, 0.6 $cm^3/g$ to 0.8 $cm^3/g$, or 0.7 $cm^3/g$. In yet another non-limiting example, the particles of the rounded octahedral structure may have a pore diameter from 5 Å to 50 Å, preferably 10 Å to 45 Å, preferably 15 Å to 40 Å, preferably 20 Å to 35 Å, preferably 25 Å to 30 Å, or 27.5 Å.

In some aspects, the PCM obtained by the methods of the present disclosure is a shape stabilized phase change material (ss-PCM). The ss-PCM may have a PEG to UiO-66 weight ratio ranging from 1:0.2 to 0.2:1, preferably 0.8:0.4 to 0.4:0.8, or 1:1. In a non-limiting example, the PEG to UiO-66 weight ratio may be such that the PEG is at least 5 times, at least 4.5 times, at least 4 times, at least 3.5 times, at least 3 times, at least 2.5 times, at least 2 times, or at least 1.5 times the UiO-66. In another non-limiting example, the PEG to UiO-66 weight ratio may be such that the UiO-66 is at least 5 times, at least 4.5 times, at least 4 times, at least 3.5 times, at least 3 times, at least 2.5 times, at least 2 times, or at least 1.5 times the PEG.

In some examples, the ss-PCM may have a PEG to UiO-66 weight ratio ranging from 0.5:0.2 to 1:0.2., preferably 0.4:0.3 to 0.75:0.25, or 1:1. In some examples, the PEG to UiO-66 weight ratio may be 0.5:0.2, preferably 0.45:0.25, preferably 0.4:0.3, or 1:1. In some examples, the PEG to UiO-66 weight ratio may be 0.7:0.2, preferably 0.65:0.25, preferably 0.6:0.3, preferably 0.55:0.35, preferably 0.5:0.4, or 1:1. In some examples, the PEG to UiO-66 weight ratio may be 1:0.2, preferably 0.9:0.3, preferably 0.8:0.4, preferably 0.7:0.5, or 1:1. In some examples, the PEG to UiO-66 weight ratio may be 0.5:1, preferably 0.6:0.9, preferably 0.7:0.8. or 1:1. In some examples, the PEG to UiO-66 weight ratio may be 1:1.

The PCM may have a thermal conductivity ranging from 0.8 W/mK to 0.9 W/mK, preferably 0.81 W/mK to 0.89 W/mK, preferably 0.82 W/mK to 0.88 W/mK, preferably 0.83 W/mK to 0.87 W/mK, preferably 0.84 W/mK to 0.86 W/mK, or 0.85 W/mK. In a non-limiting example, the PCM may have a thermal conductivity ranging from 0.4 W/mK to 0.6 W/mK at a PEG to UiO-66 weight ratio of 0.5, preferably 0.42 W/mK to 0.58 W/mK, preferably 0.44 W/mK to 0.56 W/mK, preferably 0.46 W/mK to 0.54 W/mK, preferably 0.48 W/mK to 0.52 W/mK, or 0.5 W/mK.

Further, the PCM may have an energy storage efficiency of at least 99%, preferably at least 98%, 97%, 96%, 95%, 94%, 93%, 92%, 91%, or 90% and heat storage efficiency of at least 99%, preferably at least 98%, 97%, 96%, 95%, 94%, 93%, 92%, 91%, or 90%. In a non-limiting example, the PCM may have an energy storage efficiency from 92% to 99%, preferably 93% to 98%, preferably 94% to 97%, preferably 95% to 96%, or 96.5%. In some examples, the PCM may have an energy storage ability of at least 70%, preferably at least 68%, 66%, 64%, 62%, 60%, 58%, 56%, 54%, 52%, or 50%.

Furthermore, the PCM may have a latent heat in a freezing process of at least 100 J/g, preferably at least 98 J/g, 96 J/g, 94 J/g, 92 J/g, 90 J/g, 88 J/g, 86 J/g, 84 J/g, 82 J/g, or 80 J/g and a latent heat in a melting process of at least 110 J/g, preferably at least 108 J/g, 106 J/g, 104 J/g, 102 J/g, 100 J/g, 98 J/g, 96 J/g, 94 J/g, 92 J/g, or 90 J/g. In a non-limiting example, the ss-PCM may have a latent heat value from 125 J/g to 175 J/g at a PEG to UiO-66 weight ratio of 0.5, preferably 130 J/g to 170 J/g, preferably 135 J/g to 165 J/g, preferably 140 J/g to 160 J/g, preferably 145 J/g to 155 J/g, or 150 J/g. Additionally, the PCM may have a freezing temperature of at least 35° C., preferably at least 34° C., 33° C., 32° C., 31° C., 30° C., 29° C., 28° C., 27° C., 26° C., or 25° C. and a melting temperature of at least 55° C., preferably at least 54° C., 53° C., 52° C., 51° C., 50° C., 49° C., 48° C., 47° C., 46° C., or 45° C.

In some examples, the PCM may have an impregnation ratio of at least 60%, preferably at least 59%, 58%, 57%, 56%, 55%, 54%, 53%, 52%, 51% or 50% and an impregnation efficiency of at least 55%, preferably at least 54%, 53%, 52%, 51%, 50%, 49%, 48%, 47%, 46% or 45%. The impregnation ratio can be defined as the amount of polymer that is absorbed into the ss-PCM per unit volume of the ss-PCM. The impregnation efficiency is defined as the amount of polymer absorbed into the ss-PCM per unit volume of the ss-PCM per the amount of polymer used in total.

EXAMPLES

The following examples describe and demonstrate exemplary embodiments of the method to form the PCM described herein. The examples are provided solely for the purpose of illustration and are not to be construed as limitations of the present disclosure, as many variations thereof are possible without departing from the spirit and scope of the present disclosure.

Materials 1,4-Benzenedicarboxylic acid, 2-amino-1,4-benzenedicarboxylic acid, DMF, and zirconium tetrachloride were used. Polyethylene glycol (MW 1000, 4000, 6000, and 10000) used as the PCM material and solvent ethanol were used as well. All chemicals were used without further purification.

Example 1

Synthesis of UiO-66

UiO-66 was synthesized using a Hydrothermal Method. 1,4-Benzenedicarboxylic acid (100 mg, 0.6 mmol), and $ZrCl_4$ (133.6 mg, 0.6 mmol) were dissolved in 40 mL of DMF and heated at 393 K for 24 h to form the UiO-66 PCM. The resulting UiO-66 was washed three times with DMF (5-10 mL) using a centrifuge (10000 rpm for 30 min), and then was sequentially treated with methanol (5-10 mL three times per day) for three 24 h periods. Finally, UiO-66 was activated by removing the solvent under vacuum for 24 h at 100° C.

Example 2

Synthesis of UiO-66-$NH_2$

UiO-66-$NH_2$ was synthesized by dissolving $ZrCl_4$ (125 mg, 0.54 mmol) and 2-amino-1,4-benzenedicarboxylic acid (134 mg, 0.75 mmol) in DMF (20 mL) with ultrasonication for 30 min. The as-obtained mixture was transferred to a stainless-steel Teflon-lined autoclave of 50 mL capacity and heated at 393 K for 24 h. Then the autoclave was cooled in air to room temperature. The resulting solid was filtered, repeatedly washed with $CHCl_3$, and dried at room temperature.

Example 3

Preparation of Composite PCM

PEG-MOF, specifically PEG-UiO-66 PCM composite, was synthesized by dissolving varying amounts of PEG-6000 (1.0 g, 0.7 g, and 0.5 g) and 0.2 g of UiO-66 in 50 mL ethanol. PEG-6000 and UiO-66 were mixed well by stirring for 30 min. The mixture was then placed in an ultrasonication machine for another 30 min for further dissolution. The solution was allowed to stand at 80° C. for 24 h with stirring to remove the ethanol by evaporation. Finally, PEG-6000-1.0 g/UiO-66-0.2 g (PU-1.0), PEG-6000-0.7 g/UiO-66-0.2 g (PU-0.7), and PEG-6000-0.5 g/UiO-66-0.2 g (PU-0.5) composite PCM samples were obtained.

In addition, composite PCM samples having PEG of different molecular weights, viz., PEG-1000-0.5/UiO66-0.2 g (PU-1000-0.5), PEG-4000-0.5/UiO66-0.2 g (PU-4000-0.5), and PEG-10000-0.5/UiO66-0.2 g (PU-10000-0.5) were also prepared.

Further, composite PCM samples having CNTs, PEG-0.5 g/UiO-66-0.2 g-CNT 5 wt. % (PU-0.5-CNT 5 wt. %), and —$NH_2$ functional groups, PEG-0.5 g/UiO-66-$NH_2$-0.2 g (PU-$NH_2$-0.5) were also prepared.

The PCM samples prepared using PEG-6000 (PU-1.0, PU-0.7, PU-0.5) were then characterized, as described below. The properties of additionally prepared PCM samples (PU-1000-0.5, PU-4000-0.5, PU-10000-0.5, PU-0.5-CNT 5 wt. %, and PU-$NH_2$-0.5) were also evaluated for comparison purposes.

Example 4

Powder X-Ray Diffraction (PXRD) Pattern Analysis

The PXRD patterns were obtained using a Bruker D8 advance diffractometer system (Berlin, Germany). All data were collected at a scanning velocity of 3 $min_{-1}$ in the range of 2θ=10-70°.

Figure 2:
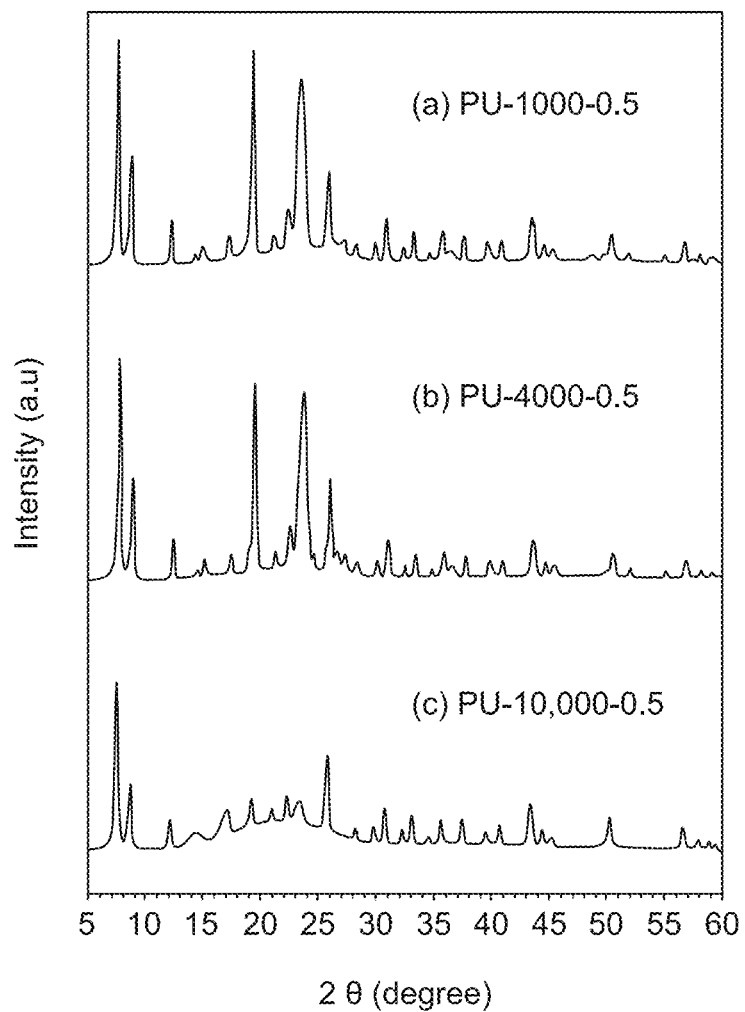
FIG. 2 shows PXRD plot depicting the spectra of (a) PU-1000-0.5 PCM samples, (b) PU-4000-0.5 PCM samples, and (c) PU-10000-0.5 PCM samples, according to certain embodiments of the present disclosure.

Powder X-ray diffraction (PXRD) patterns are shown FIG. 1 and FIG. 2. Referring to FIG. 1, (a) shows the PXRD pattern of UiO-66 alone, (b) shows the PXRD pattern of PEG-6000 alone, (c) shows the PXRD pattern of PU-0.5, (d) shows the PXRD pattern of PU-0.7, and (e) shows the PXRD pattern of PU-1.0. Referring to FIG. 2, (a) shows the PXRD pattern of PU-1000-0.5, (b) shows the PXRD pattern of PU-4000-0.5, and (c) shows the PXRD pattern of PU-10000-0.5.

As seen in FIG. 1(c-e) and FIG. 2(a-c), all composites show similar PXRD patterns. The peaks appearing in the 2θ range of 15°-30° are similar to the diffraction peaks of crystalline PEG-6000 shown in FIG. 1(b). Intense sharp peaks present at 2θ of 19.24° and 23.42° indicate the presence of crystalline PEG-6000. The characteristic peaks at 2θ=7.78° and 8.92° for UiO-66 with a high crystallinity was observed.

As seen in FIG. 1(b) and FIG. 1(c), the peaks of PU-0.5 are smaller than those of PEG-6000 alone, indicating that the pores of PU-0.5 are occupied by the melted PEG-6000. The confinement of PEG-6000 melted in the pores of the composites decreased the crystallite size of PEG-6000.

Further, as seen in FIG. 1(c), FIG. 1(d), and FIG. 1(e), PU-0.5 shows the largest decrease in peak height compared to PU-0.7 and PU-1.0. This indicates that the liquid PEG-6000 retention in a PU-0.5 is best and a larger fraction of PEG-6000 is impregnated in the porous structure, implying that the PU-0.5 sample may provide excellent performance in solar energy storage. New peaks did not appear in the PXRD pattern shown in FIG. 1(c) when PEG-6000 is mixed with UiO-66, indicating that mixing is purely physical without affecting the crystallinity of PEG-6000 and UiO-66. Hence, UiO-66 MOF is a promising matrix to be used as a support for ss-PCM preparation.

Turning to FIG. 2, the PXRD patterns of (a) PU-1000-0.5, (b) PU-4000-0.5, and (c) PU-10000-0.5, respectively, also show that the main peaks of PEG-6000 and UiO-66 MOF, as depicted in FIG. 1(a) and FIG. 1(b), indicating that their mixing is purely physical.

Example 5

Fourier-Transform Infrared (FTIR) spectroscopy

A Bruker FTIR spectrometer (Berlin, Germany) was used to record the FTIR spectra.

Figure 3:
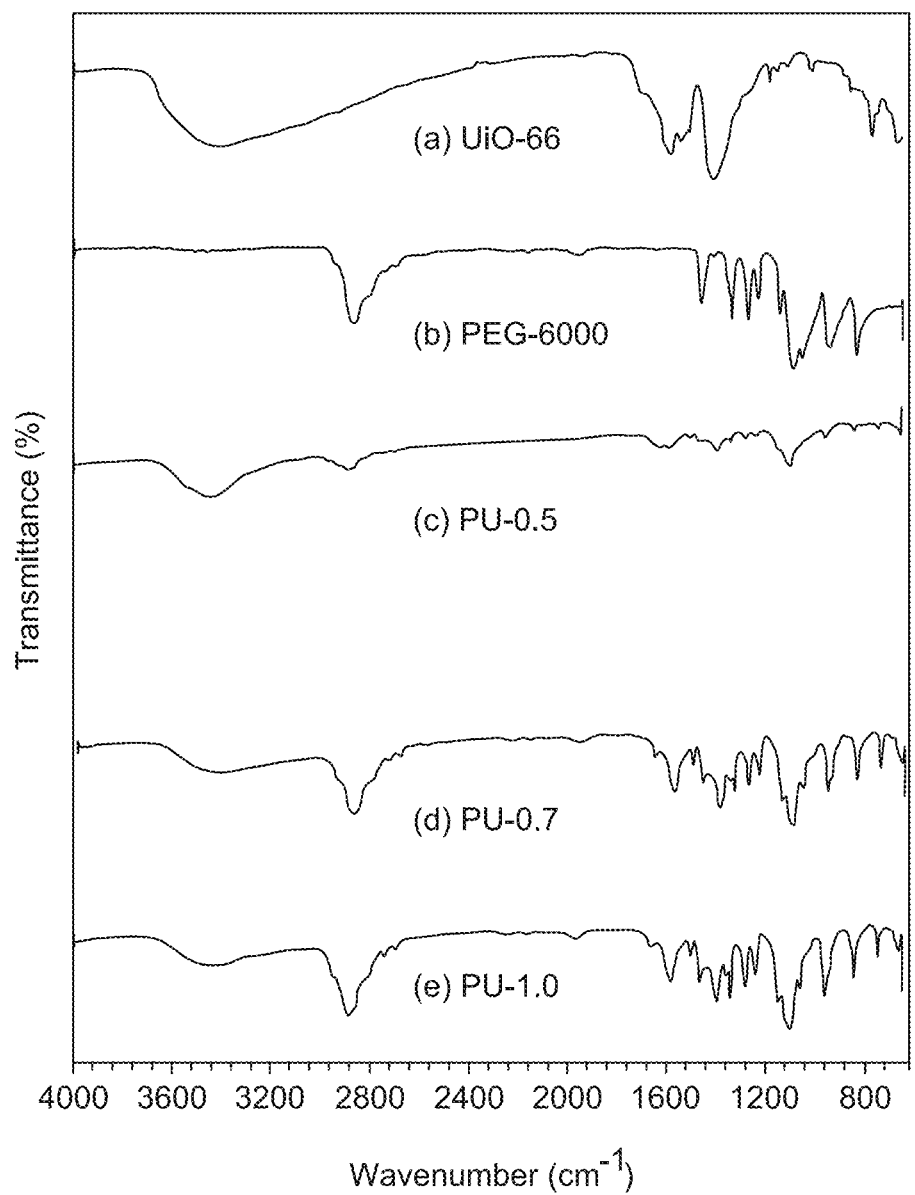
FIG. 3 shows FTIR spectra of (a) UiO-66, (b) PEG-6000, (c) PU-0.5 PCM samples, (d) PU-0.7 PCM samples, (e) PU-1.0 PCM samples, according to certain embodiments of the present disclosure.

Referring to FIG. 3, (a) shows the FTIR spectrum of UiO-66 alone, (b) shows the FTIR spectrum of PEG-6000 alone, (c) show the FTIR spectrum of PU-0.5, (d) show the FTIR spectrum of PU-0.7, and (e) show the FTIR spectrum of PU-1.0.

In FIG. 3(a), FTIR spectrum of UiO-66 reveals bands in the range of 1550-1630 $cm^{-1}$ and 1450-1580 $cm^{-1}$ which are due to the symmetric and asymmetric stretching associated with the carboxylate ligands. The broad peak in the range of 3400-3450 $cm^{-1}$ is due to O—H stretching associated with the water molecules. The medium intensity peak at 745 $cm^{-1}$ is due to Zr—O stretching. The peak at 728 $cm^{-1}$ is also due to M-O stretching in UiO-66.

In FIG. 3(b), the peak at 1109 $cm^{-1}$ of PEG-6000 is attributed to the stretching vibration of C—O—C. The peak at 1095 $cm^{-1}$ is assigned to C—O—H, whereas the one at 1279 $cm^{-1}$ is attributed to OH. The two peaks at 1339 and 1464 $cm^{-1}$ are due to bending vibrations of C—H. The absorption bands at 2882 $cm^{-1}$ are due to the stretching vibrations of C—H and OH, respectively.

The spectra of the composites shown in FIG. 3(c-e) have peaks similar to those of PEG-6000, as shown in FIG. 3(b). The peak observed at a wavenumber of 713.6 $cm^{-1}$ in FIG. 3(b) is also present in the spectra of the composites shown in FIG. 3(c-e), indicating that the support matrix UiO-66 remains unchanged. Very intense peak at 882 $cm^{-1}$ is due to the stretching vibration associated with the functional group —CH2.

The FTIR spectra of PU-0.5, PU-0.7, and PU-1.0 show that peaks due to UiO-66 as well as PEG-6000 are present. No new peaks are present, indicating that only physical mixing is taking place in well-mixed UiO-66 and PEG-6000 composites. When seen in combination with PXRD patterns, FTIR results indicate that PEG-6000 successfully penetrates the porous structure of UiO-66, without disturbing the crystalline structure of the MOF framework.

Example 6

Morphology of the Composite PCM Samples was Analyzed Using Field Emission Scanning Electron Microscope (FESEM) imaging and Transmission Electron Microscope (TEM) imaging. FESEM (TESCAN LYRA3, Czech Republic) was used to determine the morphology and size of the particles. TEM images were obtained using a JEOL Inc., JEM 2011, with a CCD camera operating at 200 kV.

Figure 4A:
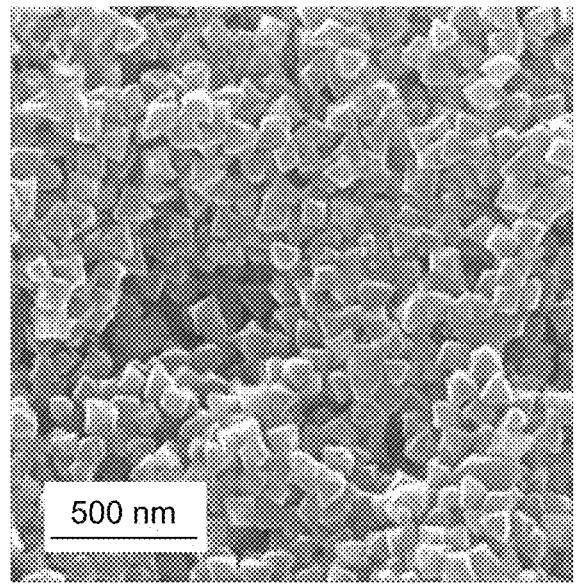
FIG. 4A shows FESEM image of as-synthesized UiO-66 sample, according to certain embodiments of the present disclosure.
Figure 4B:
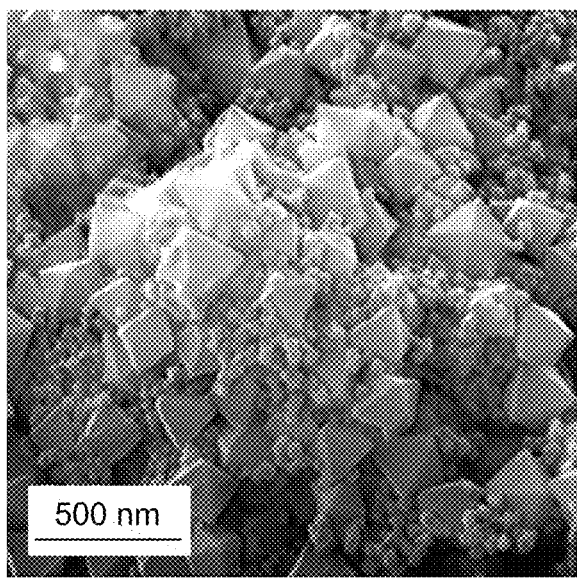
FIG. 4B shows FESEM image of as-synthesized PU-0.5 PCM samples, according to certain embodiments of the present disclosure.
Figure 4C:
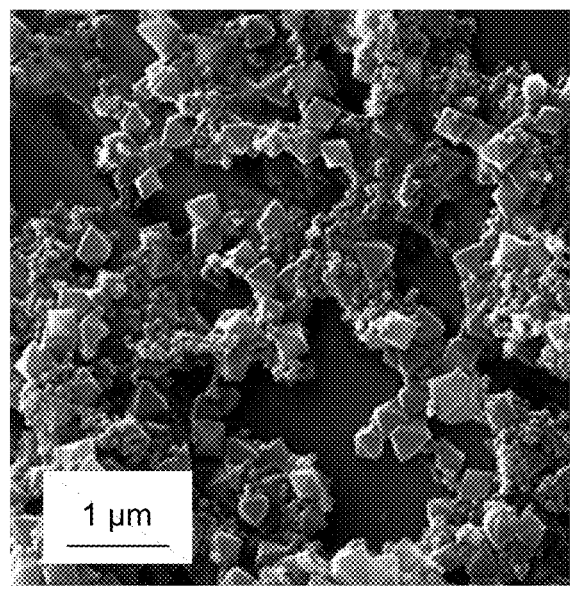
FIG. 4C shows FESEM image of as-synthesized PU-0.7 PCM samples, according to certain embodiments of the present disclosure.
Figure 4D:
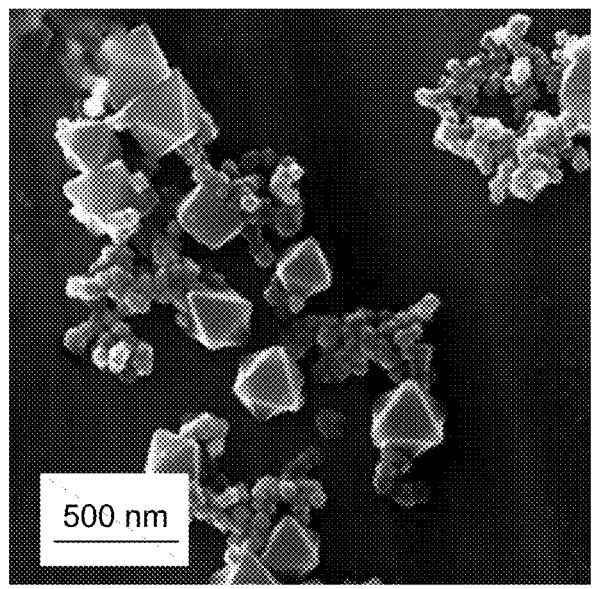
FIG. 4D shows FESEM image of as-synthesized PU-1.0 PCM samples, according to certain embodiments of the present disclosure.
Figure 5A:
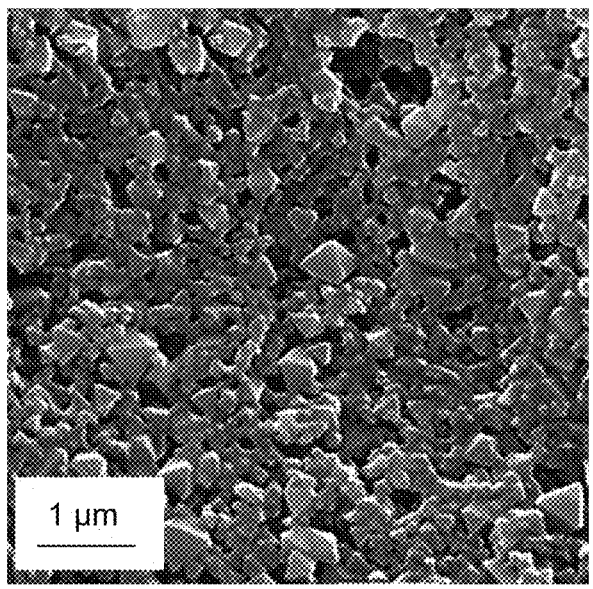
FIG. 5A shows FESEM image of as-synthesized PU-1000-0.5 PCM samples, according to certain embodiments of the present disclosure.
Figure 5B:
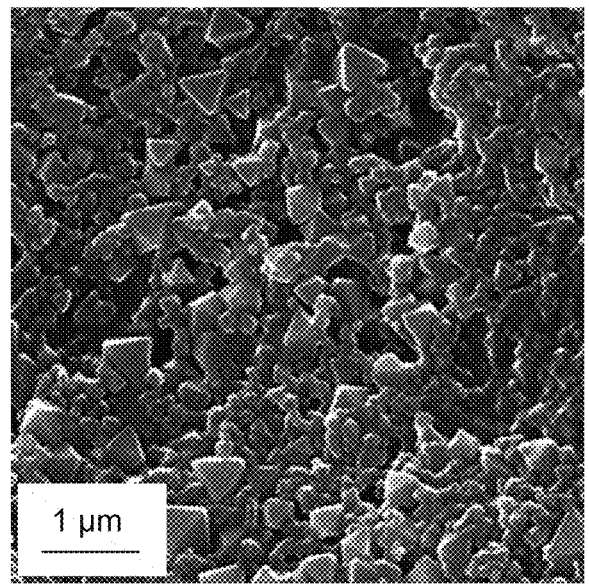
FIG. 5B shows FESEM image of as-synthesized PU-4000-0.5 PCM samples, according to certain embodiments of the present disclosure.
Figure 5C:
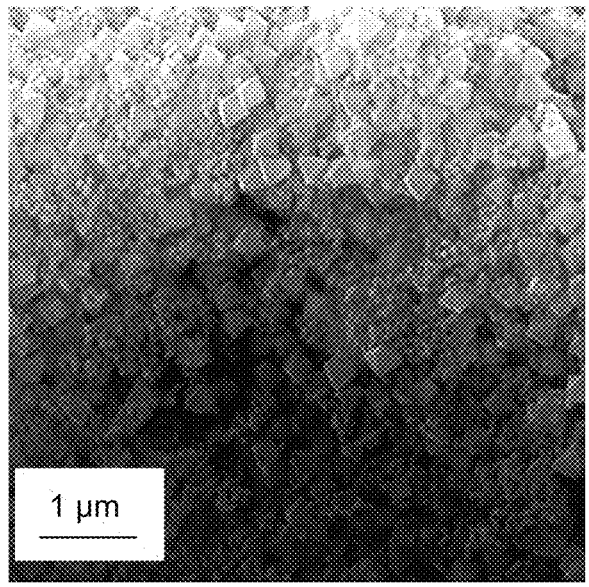
FIG. 5C shows FESEM image of as-synthesized PU-6000-0.5 PCM samples, according to certain embodiments of the present disclosure.
Figure 5D:
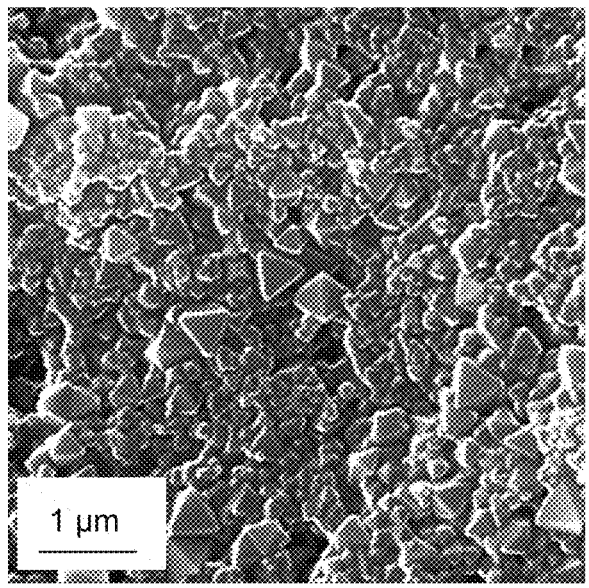
FIG. 5D shows FESEM image of as-synthesized PU-10000-0.5 PCM samples, according to certain embodiments of the present disclosure.

FIG. 4A shows the FESEM image of UiO-66 alone. FIG. 4B, FIG. 4C, and FIG. 4D show the FESEM images of PU-0.5, PU-0.7, and PU-1.0, respectively.

As seen in FIG. 4B, FIG. 4C, and FIG. 4D, presence of two types of particles is revealed. Some particles have the morphology of original MOF, i.e., UiO-66, while other particles are smaller but have a shape similar to that of UiO-66. These smaller particles are PEG-MOFs (PU-0.5, PU-0.7, PU-1.0) consisting of intergrown rounded octahedral structures.

As seen in FIG. 4A, FIG. 4B, FIG. 4C, and FIG. 4D, the addition of PEG-6000 to MOF yields small-sized PEG-MOFs with octahedral structures and the amount or production yield of PEG-MOFs depends on the quantity of PEG-6000 added into the system. The formation of the smallest PEG-MOF particles and the highest amount of PEG-MOF was observed in the case of PU-0.5, as shown in FIG. 4B. The results indicate that PEG-6000 penetrates the UiO-66 MOF and produces PEG-MOFs. Addition of a larger quantity of PEG-6000 into UiO-66 produces a lower quantity of PEG-MOFs with a thin-film type morphology, where the PEG-MOFs are attached to each other very closely, as seen in FIG. 4C and FIG. 4D. Referring to FIGS. 4C and 4D, the penetration of PEG into the MOF can be seen, where the octahedral particles intertwine with the PEG during formation.

Referring to FIG. 1, FIG. 2 and FIGS. 4A to 4D, the crystallinity of the PCM samples determined by PXRD can be explained using the morphology of these samples. Sharper diffraction patterns in FIG. 1(d) and FIG. 1(e) are probably due to lower production of PEG-MOFs and a small amount of PEG-6000 penetrating the MOFs. In the case of PU-0.5, with a larger fraction of PEG-6000 penetrating the MOFs, the peaks in diffraction pattern are smaller, as depicted in FIG. 1(c).

Turning to FIG. 5A, FIG. 5B, FIG. 5C, and FIG. 5D, the morphology of PU-1000-0.5, PU-4000-0.5, PU-6000-0.5 (PU-0.5), and PU-10000-0.5, respectively, is shown. Also, FIG. 6A, FIG. 6B, FIG. 6C, and FIG. 6D show the morphology of PU-1000-0.5, PU-4000-0.5, PU-6000-0.5 (PU-0.5), and PU-10000-0.5, respectively, at a higher magnification.

As seen in FIGS. 5A to 5D and FIGS. 6A to 6D, increasing molecular weight of PEG in PCM samples produces slightly larger particles. Only PU-0.5 produces very small PEG-MOFs, majorly of a uniform size and shape.

Figure 7B:
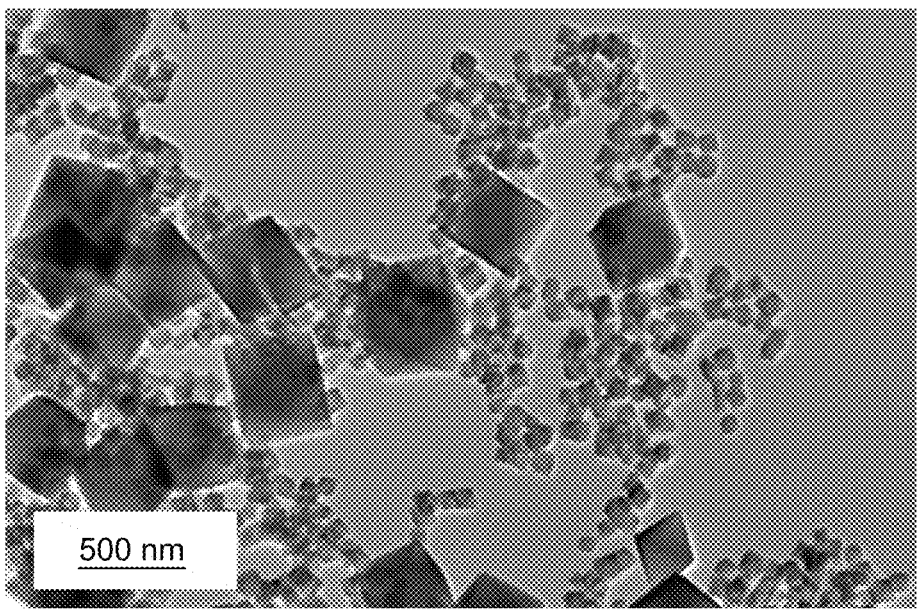
FIG. 7B shows TEM image of as-synthesized PU-0.5 PCM samples, according to certain embodiments of the present disclosure.

Referring to FIG. 7A and FIG. 7B, TEM image of UiO-66 alone and PU-0.5 is shown, respectively. The MOF particles are connected through PEG-MOF networks as shown in FIG. 7B. The nanosized original PEG-MOF (smaller crystals) particles are clearly visible.

Example 7

Thermal Storage Properties

The melting and freezing points and the latent heat of the composite PCM samples were determined using a DSC-Q2000. DSC data were collected by heating 8.5 mg of each sample sealed in an aluminum pan. DSC data were obtained under an argon gas flow rate of 20 mL/min at a heating rate of 5° C./min. The maximal deviations for phase change temperature and latent heat values determined based on the average of three measurements are ±0.11° C. and ±0.43 J/g, respectively.

Figure 8:
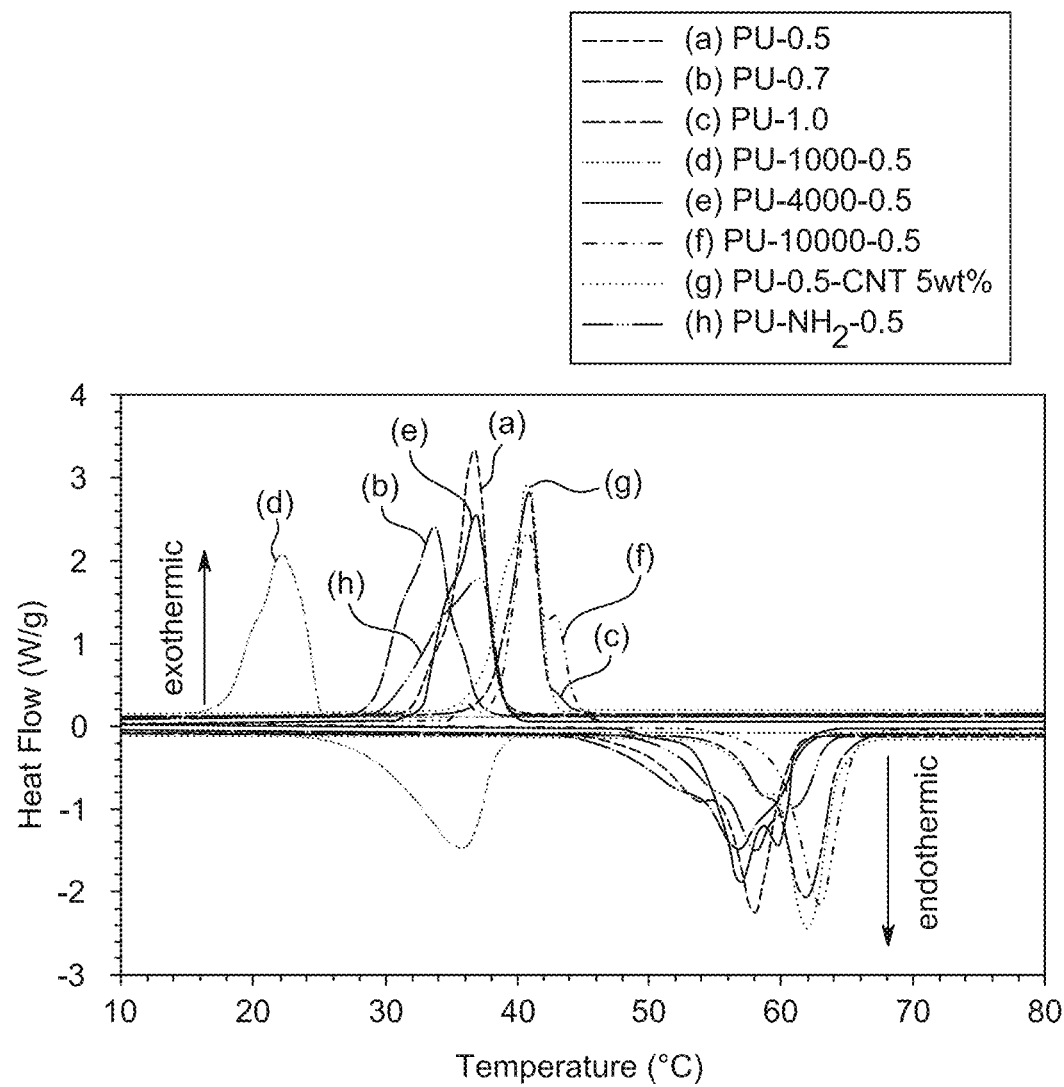
FIG. 8 shows melting-freezing DSC curves of (a) PU-0.5 PCM samples, (b) PU-0.7 PCM samples, (c) PU-1.0 PCM samples, (d) PU-1000-0.5 PCM samples, (e) PU-4000-0.5 PCM samples, (f) PU-10000-0.5 PCM samples, (g) PU-0.5-CNT 5 wt % PCM samples, and (h) PU-$NH_2$-0.5 PCM samples, according to certain embodiments of the present disclosure.

Referring to FIG. 8, the melting-freezing DSC curves of (a) PU-0.5, (b) PU-0.7, (c) PU-1.0, (d) PU-1000-0.5, (e)

PU-4000-0.5, (f) PU-10 000-0.5, (g) PU-0.5-CNT 5 wt. %, and (h) PU-NH$_2$-0.5) are shown. For all composites and pure PEG-6000, the melting temperature ($T_m$), freezing temperature ($T_f$), latent melting heat, and latent freezing heat are listed in Table 1.

from room temperature to 600° C. under a dry nitrogen atmosphere. To assess the BET properties, i.e., pore size distribution, specific surface area etc., a NOVA-1200 device (JEOL U.S.A.) was used. A Tristar II 3020 system was employed to determine the BET surface area.

TABLE 1

Phase-change characteristics of the PEG and PEG/UiO-66 ss-PEM [PEG-6000 = PEG]

| sample | phase change temperature (° C.) | | phase change enthalpy ΔH(J/g) | | Supercooling ΔT | | | | |
|---|---|---|---|---|---|---|---|---|---|
| | freezing | melting | freezing | | | | | melting | |
| | $T_f$(° C.) | $T_m$(° C.) | $\Delta H_f$(J/g) | $\Delta H_m$(J/g) | $\Delta T_g$(° C.) | R % | E (%) | γ(%), | φ (%) |
| PEG | 39.5 | 63.84 | 201 | 221.3 | 24.34 | | | | 100 |
| PEG-0.5 | 36.6 | 58.03 | 135 | 146 | 21.39 | 66 | 66.6 | 101 | 92.36 |
| PU-0.7 | 34.2 | 56.67 | 130.2 | 134 | 22.42 | 63.5 | 64.1 | 100.8 | 88.85 |
| PU-1.0 | 37.4 | 58.12 | 113.1 | 122 | 20.76 | 55.7 | 55.7 | 101 | 77.18 |
| PU-0.5-CNT | 42.2 | 61.69 | 119.1 | 120.9 | 19.53 | 52.1 | 54.2 | 104 | 76.48 |
| PEG-10000 0.5/UiO-66 0.2 | 40.9 | 62.91 | 105 | 109.5 | 21.96 | 51.7 | 52 | 104 | 72.44 |
| PEG-4000 0.5/UiO-66 0.2 | 36.8 | 56.98 | 119.5 | 122.8 | 20.2 | 58.3 | 58.8 | 101 | 81.6 |
| PEG-1000 0.5/UiO-66 0.2 | 22.1 | 35.59 | 113.6 | 115.3 | 13.45 | 52.1 | 54.2 | 104 | 72.94 |
| PEG-6000.5/UiO-66 NH$_2$ 0.2 | 41.5 | 59.07 | 107.6 | 110 | 17.53 | 49.7 | 51.5 | 103.7 | |

$T_f$ = freezing temperature, $T_m$ = melting temperature, $\Delta H_f$ = latent heat in freezing process, $\Delta H_m$ = latent heat in melting process, ΔT = supercooling, R% = impregnation ratio, E (%) = impregnation efficiency, γ = heat storage efficiency, and φ = energy storage ability (capability), and blank cells indicate that data are not available.

For the freezing and melting cycles, the enthalpies of PEG-6000 and the composites were determined using the region under the DSC curves. As seen in Table 1, PU-0.5 performs better with an impregnation ratio of 65.97% compared to 54.20% for PU-0.5-CNT 5 wt. %. The impregnation efficiency (E %) of PU-0.5 is also the highest among the tested samples. The thermal storage capacity of PU-0.5 composites indicates that almost all PEG-6000 molecules efficiently release/store energy through the transition of phases. The supercooling ΔT values are based on the difference between the freezing and melting temperatures, ΔTs of pure PEG-6000, PU-0.5, PU-0.7, and PU-1.0 is 24.34° C., 21.39° C., 22.42° C., and 20.76° C., respectively. The supercooling problem is overcome most likely due to the higher thermal conductivity. A high latent heat value of 146 J/g, the highest among the tested samples, was observed for the PU-0.5 sample. The high latent heat value of PU-0.5 indicates that the ss-PCM is a potential candidate to produce building materials to provide comfort in buildings. Among the tested samples, PU-0.5 also demonstrates the highest energy storage efficiency of 96.48%. Further, the highest amount PolyMOF is formed in the case of the PU-0.5 sample which may be playing a vital role in enhancing the latent heat storage capability.

Example 8

Pore the Size and Pore Volume

Figure 9A:
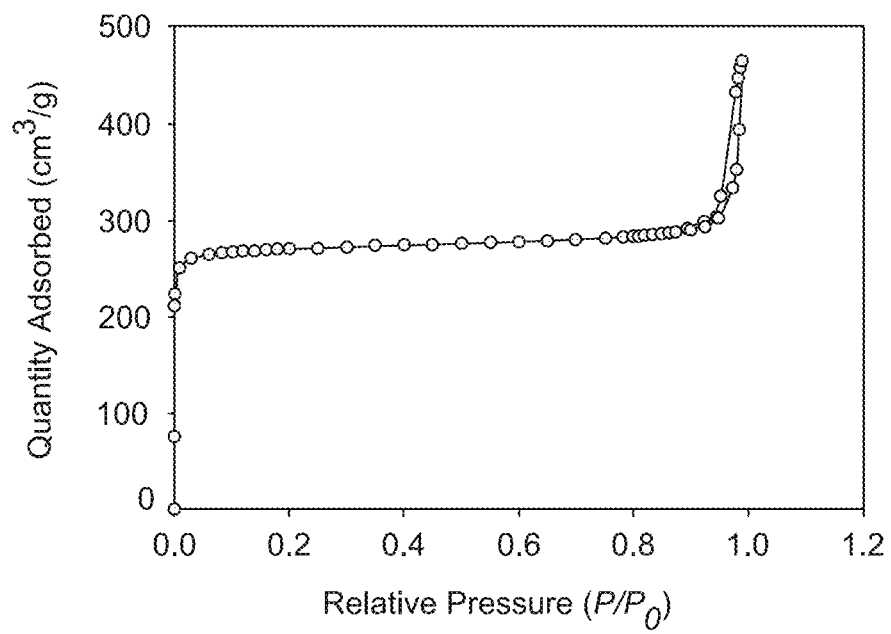
FIG. 9A shows nitrogen adsorption—desorption isotherm of the as-synthesized UiO-66, according to certain embodiments of the present disclosure.
Figure 9B:
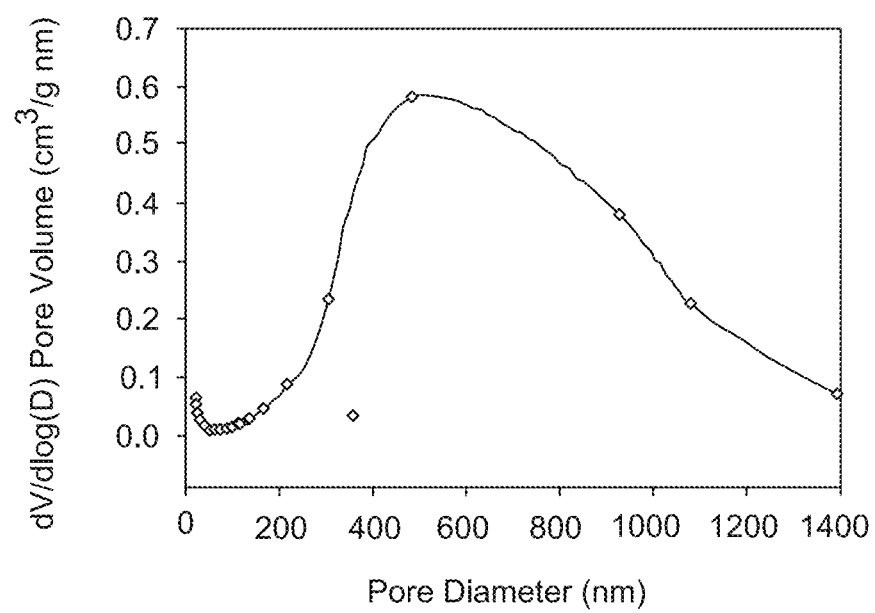
FIG. 9B shows pore size distribution of the as-synthesized UiO-66, according to certain embodiments of the present disclosure.

The N$_2$ adsorption-desorption isotherms were obtained at −196° C. using liquid N$_2$. The pore size distribution was calculated using the Barrett—Joyner—Halenda formula. The sample powders were evacuated for 3 h at 200° C. Then the experiment was conducted at a heating rate of 5° C./min The N$_2$ adsorption-desorption isotherm of UiO-66, is shown in FIG. 9A. The isotherm of UiO-66 MOF shows Type I adsorption and desorption followed by small loops for hysteresis of H3. UiO-66 has a calculated BET surface area of 1067 m$^2$/g which is indicative of the quite high pore volume. In FIG. 8B, a pore size distribution of UiO-66 is shown.

Typically, the performance of an ss-PCM depends on the porosity of the matrix which plays an important role in the polymer penetration process. The high pore volume of UiO-66 (micropore volume of 0.379 cm$^3$g$^{-1}$ and pore diameter of 18.96 Å) and the structure of the polyMOF plays a crucial role in the high latent heat of the PCMs based on UiO-66. These properties also increase the thermal stability of PU-0.5 PCM during melting and freezing cycles.

Figure 9C:
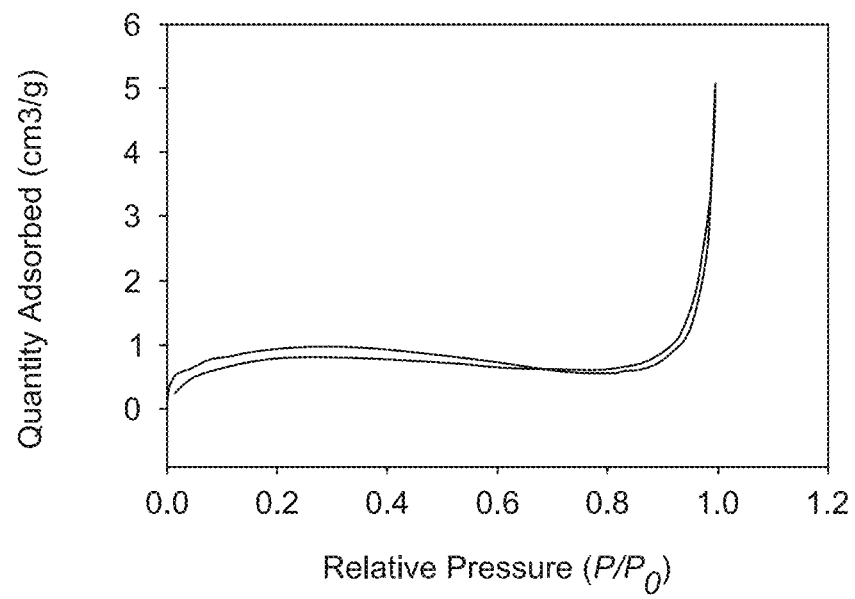
FIG. 9C shows nitrogen adsorption—desorption isotherm of the as-synthesized PU-0.5 PCM samples, according to certain embodiments of the present disclosure.

Referring to FIG. 9C, the N$_2$ adsorption—desorption isotherm of PU-0.5 indicates that it is nonporous. The calculated BET surface area of the material is 2.80±0.18 m$^2$g$^{-1}$ and the pore volume is 0.00137 cm$^3$g$^{-1}$. These results indicate that the pores in UiO-66 MOF are filled with PEG-6000, which is also confirmed by the PXRD data.

Example 9

Thermal Stability

Thermogravimetric analysis (TGA) was performed using a Shimadzu thermal analyzer (TA-50). About 10 mg each of the PCM samples was used to perform TGA. The heating rate was maintained at 5° C./min from 25 to 600° C. under a dry nitrogen atmosphere.

Figure 10:
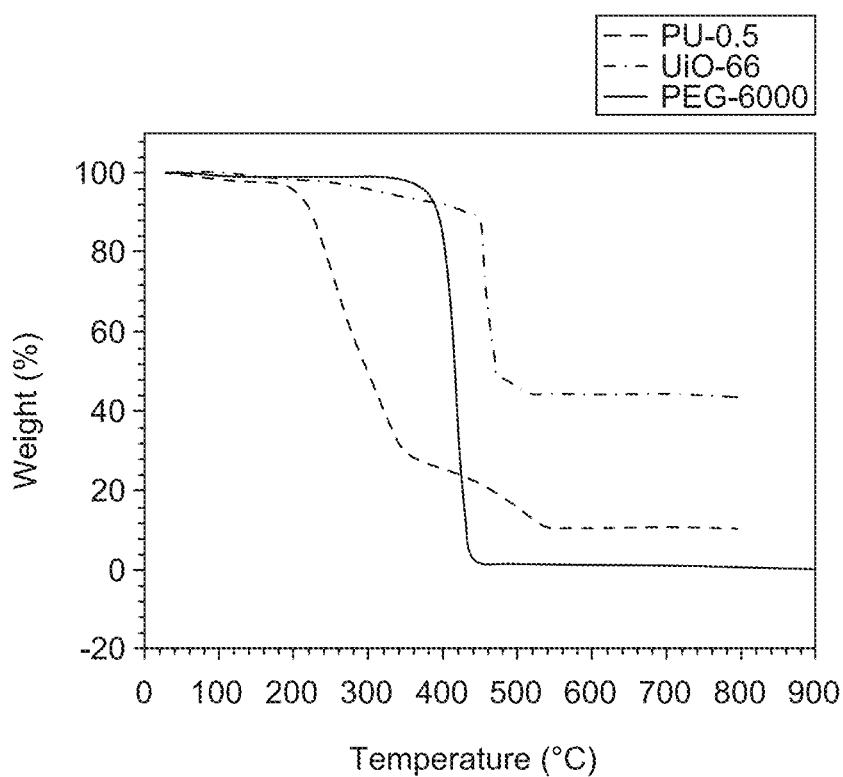
FIG. 10 shows TGA curves of the PU-0.5 PCM samples, UiO-66, and PEG-6000,according to certain embodiments of the present disclosure.

Referring to FIG. 10, TGA curve of PEG-6000, as-synthesized UiO-66, and PU-0.5 is shown. All the samples were dried at 100° C. for 24 h before the TGA test.

During the thermal decomposition, consecutive large weight losses occur from 220° C. to 460° C. The weight loss of porous UiO-66 is about 42.5% at 460° C. The successive weight losses can be due to dehydroxylation of —OH and the decomposition of the 1,4-benzene dicarboxylic acid and $CO_2$. At the end of the decomposition, the remaining residue is mainly zirconium oxides derived from UiO-66. At about 78° C., pure PEG-6000 starts to melt. Sudden decomposition of pure PEG-6000 sample begins at about 400° C. and the total weight loss is 100% at about 440° C. In addition to the removal of absorbed water and hydroxyl groups from the matrix, the weight loss observed for PU-0.5 composite is due to the decomposition of organic molecules. A noteworthy aspect is that the total weight of PU-0.5 is 17% higher than that of pure PEG-6000, clearly indicating that PEG-6000 is thoroughly mixed and/or has penetrated the porous structure of UiO-66. Significant decomposition of PU-0.5 does not take place below 80° C. The composite PU-0.5 PCM demonstrates the thermal stability of the combination of UiO-66 and PEG-6000. By creating a self-protective barrier, the porous UiO-66 support can enhance the thermal stability of organic PEG-6000. The overall weight loss of the PU-0.5 composite is 78.2% at about 560° C. In the lower temperature range of 25° C. to 200° C., the weight loss of PU-0.5 is negligible.

Example 10

Thermal Cycling Properties

Figure 11:
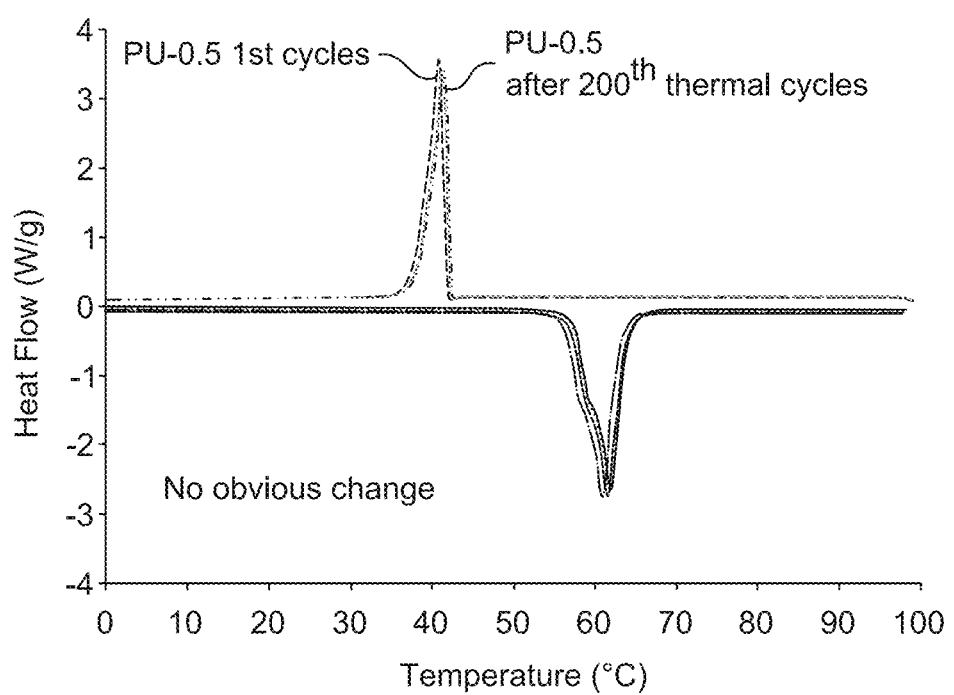
FIG. 11 shows melting—freezing DSC cycling curves of PU-0.5 PCM samples, according to certain embodiments of the present disclosure.

The thermal cycling performance of the composite PU-0.5 PCM, which is important for determining its feasibility of commercial use, was also evaluated. PU-0.5 PCM is thermally stable even after 200 cycles and a DSC curve was recorded every 50 cycles. The DSC curves recorded during cycling of PU-0.5 PCM are depicted in FIG. 11. Both exothermal and endothermal curves do not significantly change with cycling, indicating that the composite has a stable life cycle with good thermal reliability. Multi-cycle DSC curves recorded during cycling of PU-0.5 PCM indicate that PEG-6000 can sustain phase changes in terms of temperature and enthalpy, consistently. PU-0.5 can be used to store and release latent heat at a constant temperature over multiple cycles. The higher melting and solidification latent heats of PU-0.5 is due to the increased absorption of PEG-6000 promoted by capillary forces. Furthermore, it is noteworthy that during the melting cycle, formation of any vapor/gas was not observed, and no voids were not created during the freezing process. The thermal cycling performance of a composite PCM is critical for its commercial viability. Also, SEM images and FTIR spectra obtained after 200 cycles were similar to those of the starting materials.

Example 11

Seepage Test

The seepage test was performed using a sample disk and powders of UiO-66, PEG-6000, PU-0.5, and PU-0.5-CNT-5 wt. %. The UiO-66 powder did not melt after 10 min and even after 20 min. The same phenomenon was observed for the PU-0.5 sample. The microstructure of the PU-0.5 composite remained unchanged indicating the absence of leakage and even at 80° C. for 20 min, PU-0.5 powder did not melt. The weight of the PU-0.5 sample before and after heat treatment remained unchanged, indicating the absence of any weight loss. No leaks were observed in the leakage test performed for the PU-0.5-CNT 5 wt. % sample either.

Example 12

Thermal Conductivity

Thermal conductivity of the sample powders was determined using circular disk samples with a TCi Conductivity Analyzer, Canada. The equipment uses modified transient plane source (MTPS) and the measurement method is based on C-Therm Technologies.

The thermal conductivity of UiO-66 alone is 0.84 W/mK, while the thermal conductivity of PEG-6000 alone is 0.22 W/m K. A relatively high thermal conductivity of 0.52 W/mK was observed for the PU-0.5 PCM. This result is very promising considering that material with a higher conductivity has a high demand in the field of solar energy storage and its application can enhance the charging and discharging rates.

The invention claimed is:

1. A method to form a phase change material (PCM), comprising:
   preparing a polymer solution by mixing an amount of a polymer in a solvent, wherein the polymer is a polyethylene glycol (PEG);
   mixing the polymer solution with an UiO-66 metal-organic framework (MOF) to form a composite;
   subjecting the composite to ultrasonic agitation; and
   evaporating the solvent from the composite to form the PCM;, wherein a weight ratio of PEG:UiO-66 MOF in the PCM is 0.5:0.2 to 1.0:0.2,
   wherein the PCM has first particles and second particles,
   wherein the first particles comprise PEG and the UiO-66 MOF and are smaller than the second particles,
   wherein the second particles comprise only the UiO-66 MOF and have a longest dimension of 200 nm to 500 nm,
   wherein the first particles and second particles have a rounded octahedral shape, and
   wherein the second particles are connected through a network of the first particles.

2. The method of claim 1, wherein, the solvent is ethanol; the PEG has an average molecular weight of from 4000 to 10000.

3. The method of claim 2, wherein the PEG for preparing the polymer solution has an average molecular weight of 6000.

4. The method of claim 1, wherein the PCM has a thermal conductivity of from 0.8 to 0.9 W/mK; and
   the PCM has an energy storage efficiency of from 92% to 97%.

5. The method of claim 1, wherein
   the ss-PCM has a latent heat value of from 125 J/g to 175 J/g at a PEG:UiO-66 weight ratio of 0.5, and
   the ss-PCM has a thermal conductivity of from 0.4 W/mK to 0.6 W/mK at a PEG: UiO-66 weight ratio of 0.5.

6. The method of claim 1, wherein the mixing the polymer solution further comprises mixing carbon nanotubes (CNTs) with at least one of the polymer solution, the MOF, or a combination of both the polymer solution and the MOF to form a PCM containing carbon nanotubes.

7. The method of claim 6, wherein the PCM comprises the CNTs in an amount of from 1 wt % to 4 wt % of the PCM.

8. The method of claim 1, wherein the PCM has an impregnation ratio of at least 60%.

9. The method of claim 1, wherein the PCM has:
a freezing temperature of at least 35° C.; and
a melting temperature of at least 55° C.

10. The method of claim 1, wherein the PCM has an impregnation efficiency of at least 55%.

11. The method of claim 1, wherein the PCM has a heat storage efficiency of at least 99%.

12. The method of claim 1, wherein the PCM has an energy storage ability of at least 70%.

13. The method of claim 1, wherein the PCM has a latent heat in a freezing process of at least 100 J/g.

14. The method of claim 1, wherein the PCM has a latent heat in a melting process of at least 110 J/g.

15. The method of claim 1, wherein the mixing the polymer solution further comprises including an amine group-containing compound with at least one of the polymer solution, the MOF, or a combination of both the polymer solution and the MOF.

16. The method of claim 1, wherein the weight ratio of PEG to UiO-66 is 0.5:0.2.

\* \* \* \* \*